(12) United States Patent
Kawasoe et al.

(10) Patent No.: US 10,610,829 B2
(45) Date of Patent: Apr. 7, 2020

(54) HONEYCOMB SUBSTRATE FOR CATALYST SUPPORT, AND CATALYTIC CONVERTER FOR EXHAUST GAS PURIFICATION

(71) Applicant: NIPPON STEEL CHEMICAL & MATERIAL CO., LTD., Tokyo (JP)

(72) Inventors: Shinji Kawasoe, Tokyo (JP); Tooru Inaguma, Tokyo (JP); Takuzo Kako, Tokyo (JP)

(73) Assignee: NIPPON STEEL CHEMICAL & MATERIAL, CO., LTD., Tokyo (JP)

( * ) Notice: Subject to any disclaimer, the term of this patent is extended or adjusted under 35 U.S.C. 154(b) by 0 days.

(21) Appl. No.: 16/484,994

(22) PCT Filed: Feb. 26, 2018

(86) PCT No.: PCT/JP2018/007035
§ 371 (c)(1),
(2) Date: Aug. 9, 2019

(87) PCT Pub. No.: WO2018/159556
PCT Pub. Date: Sep. 7, 2018

(65) Prior Publication Data
US 2020/0023313 A1   Jan. 23, 2020

(30) Foreign Application Priority Data

Feb. 28, 2017 (JP) ................. 2017-036349

(51) Int. Cl.
*B01D 53/94* (2006.01)
*B01J 32/00* (2006.01)
(Continued)

(52) U.S. Cl.
CPC .............. *B01D 53/94* (2013.01); *B01J 32/00* (2013.01); *B01J 35/04* (2013.01); *F01N 3/0222* (2013.01); *F01N 3/28* (2013.01); *F01N 2510/061* (2013.01)

(58) Field of Classification Search
CPC combination set(s) only.
See application file for complete search history.

(56) References Cited

U.S. PATENT DOCUMENTS

| | | | |
|---|---|---|---|
| 4,331,631 A | 5/1982 | Chapman et al. | |
| 5,981,026 A | 11/1999 | Bode et al. | |
| 8,394,348 B1 * | 3/2013 | Nunan ................ | B01D 53/945 423/213.2 |

(Continued)

FOREIGN PATENT DOCUMENTS

| | | |
|---|---|---|
| JP | S56-096726 A | 8/1981 |
| JP | H03-114547 A | 5/1991 |

(Continued)

OTHER PUBLICATIONS

PCT/ISA/210, "International Search Report for International Application No. PCT/JP2018/007035," dated May 1, 2018.
(Continued)

*Primary Examiner* — Binh Q Tran
(74) *Attorney, Agent, or Firm* — Manabu Kanesaka

(57) ABSTRACT

Adhesion of a catalyst layer and an oxide film in a honeycomb substrate for catalyst support is improved. A honeycomb substrate for catalyst support used in purification of exhaust gas includes a honeycomb body and an oxide film that is formed on the surface of the honeycomb body and that has α-alumina as a main component. The oxide film includes multiple oxide projections that are formed to be dispersed on the film surface and that include a contracted shape in which the width becomes narrower near the honeycomb body, and the density of the projection formations on the film surface is 0.20 (pieces/μm$^2$)-3.00 (pieces/μm$^2$).

5 Claims, 5 Drawing Sheets

(51) Int. Cl.
  *F01N 3/022*    (2006.01)
  *F01N 3/28*     (2006.01)
  *B01J 35/04*    (2006.01)

(56) References Cited

U.S. PATENT DOCUMENTS

| | | | |
|---|---|---|---|
| 8,999,252 B2* | 4/2015 | Cho | B01D 53/945 |
| | | | 422/180 |
| 10,151,020 B2 | 12/2018 | Mizutani et al. | |
| 2002/0049137 A1* | 4/2002 | Morikawa | B01D 53/945 |
| | | | 502/351 |
| 2003/0100446 A1 | 5/2003 | Hase et al. | |
| 2006/0166029 A1 | 7/2006 | Inaguma et al. | |
| 2007/0153390 A1* | 7/2007 | Nakamura | B01D 53/945 |
| | | | 359/601 |
| 2009/0220816 A1 | 9/2009 | Takaya et al. | |
| 2009/0298673 A1* | 12/2009 | Akamine | B01J 21/066 |
| | | | 502/65 |
| 2018/0229183 A1 | 8/2018 | Kadota et al. | |

FOREIGN PATENT DOCUMENTS

| | | |
|---|---|---|
| JP | H09-505238 A | 5/1997 |
| JP | 2003-164760 A | 6/2003 |
| JP | 2004-169111 A | 6/2004 |
| JP | 2004-216242 A | 8/2004 |
| JP | 2008-023518 A | 2/2008 |
| JP | 5700181 B1 | 4/2015 |
| JP | 2017-039069 A | 2/2017 |

OTHER PUBLICATIONS

Wu, X. et al., "Influence of an aluminized intermediate layer on the adhesion of a γ-$Al_2O_3$ washcoat on FeCrAl," Surface & Coatings Technology, May 14, 2004, p. 434-439, vol. 190, Elsevier B.V.

Japan Patent Office, "Office Action for Japanese Patent Application No. 2018-541372," dated Sep. 25, 2018.

PCT/IB/338, "Notification of Transmittal of Copies of Translation of the International Preliminary Report on Patentability for International Application No. PCT/JP2018/007035," dated Sep. 12, 2019.

PCT/IB/373, "International Preliminary Report on Patentability for International Application No. PCT/JP2018/007035," dated Sep. 3, 2019.

PCT/ISA/237, "Written Opinion of the International Searching Authority for International Application No. PCT/JP2018/007035," dated May 1, 2018.

* cited by examiner

HONEYCOMB SUBSTRATE FOR CATALYST SUPPORT, AND CATALYTIC CONVERTER FOR EXHAUST GAS PURIFICATION

RELATED APPLICATIONS

The present application is National Phase of International Application No. PCT/JP2018/007035, filed Feb. 26, 2018, and claims priority from Japanese Application No. 2017-036349, filed Feb. 28, 2017, the disclosure of which is hereby incorporated by reference herein in its entirety.

TECHNICAL FIELD

The present invention relates to a honeycomb substrate for a catalyst support, which is used for exhaust gas purification of automobiles and motorcycles and is provided in an exhaust gas passage for the purpose of purifying exhaust gas of an internal combustion engine.

BACKGROUND ART

There is a catalyst support for exhaust gas purification supporting a catalyst for purifying problematic gas components such as HC (hydrocarbons), CO (carbon monoxide), and NOx (nitrogen compounds), which are harmful to the human body when released to the air.

A catalytic converter supporting a catalyst, which is used for exhaust gas purification of automobiles and motorcycles, is provided on the exhaust gas passage for the purpose of purifying exhaust gas of an internal combustion engine. For example, in urea SCR (Selective Catalytic Reduction), the urea water injected on the inlet side of an SCR reactor is hydrolyzed with the heat of the exhaust gas to produce ammonia, and NOx (nitrogen compounds) in the exhaust gas and ammonia are subjected to reduction reaction with the SCR catalyst in the SCR reactor to produce harmless nitrogen and water, and the above-mentioned catalytic converter is used as the SCR reactor. In a similar way, a substrate supporting a catalyst is also used in a methanol reformer that reforms hydrocarbon compounds such as methanol with steam to generate hydrogen-rich gas, a CO remover that reforms CO to $CO_2$ to remove CO, or an $H_2$ combustion apparatus that burns $H_2$ to $H_2O$ and removes $H_2$.

These catalyst supports are configured by partially bonding a honeycomb body formed by winding metal-made flat foil and corrugated foil, and an outer cylinder covering the outer peripheral surface in the radial direction of the honeycomb body. A large number of exhaust gas flow paths extending in the axial direction are formed in the honeycomb body, and exhaust gas can be purified by flowing the exhaust gas from the inlet side end face of the honeycomb body to the outlet side end face inside the exhaust gas flow paths.

When the catalyst falls off from the support, the purification function of the catalytic converter is reduced, so that the substrate and the catalyst are required to firmly adhere. Patent Literature 1 discloses a catalytic converter including a honeycomb metal foil, an oxide film formed on a surface of the metal foil, an adhesive layer (ceramic layer) formed on a surface of the oxide film, and a zeolite layer held in an adhesive layer.

In the invention disclosed in Patent Literature 1, the problem to be solved is that the oxide film and the zeolite layer have very different properties and structures and strong adhesion cannot be obtained even when the zeolite layer is formed directly on the oxide film, and the separation of the zeolite is prevented by interposing an adhesive layer between the oxide film and the zeolite layer.

Patent Literature 1 also discloses that the average surface roughness of the oxide film is 2 to 4 μm and the average height from peaks to valleys is at least 0.2 μm.

Patent Literature 2 discloses a material for a catalyst support for exhaust gas purifier using a ferritic stainless steel foil that has a composition containing, by mass %, C: 0.050% or less, Si: 0.20% or less, Mn: 0.20% or less, P: 0.050% or less, S: 0.0050% or less, Cr: 10.5% or more and 20.0% or less, Ni: 0.01% or more and 1.00% or less, Al: more than 1.5% and less than 3.0%, Cu: 0.01% or more and 1.00% or less, and N: 0.10% or less, and further containing at least one or two or more selected from Ti: 0.01% or more and 1.00% or less, Zr: 0.01% or more and 0.20% or less, and Hf: 0.01% or more and 0.20% or less, with the balance being Fe and unavoidable impurities, and has a composite film of an Al oxide film and a Cr oxide film on the surface thereof.

CITATION LIST

Patent Literature

Patent Literature 1: National Publication of International Patent Application No. 1997-505238
Patent Literature 2: Japanese Patent No. 5700181

SUMMARY OF INVENTION

Technical Problem

However, in Patent Literature 1, the adhesive layer is essential to hold the zeolite, and a step of applying the adhesive layer is required, so the processes become complicated and the cost increases. Moreover, in Patent Literature 1, it is disclosed that even when a zeolite layer is directly applied to the oxide film having the above-mentioned average surface roughness, strong adhesion cannot be obtained, and it is considered to be an essential requirement for solving the problem to provide an adhesive layer.

Patent Literature 2 discloses a method that improves the catalyst coating adhesion as a result of improving the shape stability at high temperatures and oxide film adhesion of stainless steel foil, but the technique for directly improving the adhesion between the catalyst and the oxide film is not considered.

Therefore, an object of the present invention is to enhance the adhesion between the catalyst layer and the oxide film in the honeycomb substrate for a catalyst support.

Solution to Problem

In order to solve the above problem, a honeycomb substrate for a catalyst support according to the present invention is (1) a honeycomb substrate for a catalyst support used for exhaust gas purification including a honeycomb body and an oxide film having α-alumina as a main component formed on a surface of the honeycomb body, wherein the oxide film includes a large number of oxide projections formed on a surface of the film in a scattered manner, the large number of oxide projections each having a tapered shape portion with a width decreasing toward the honeycomb body, and a formation density of the oxide projections on the film surface is 0.20 (projections/$\mu m^2$) or more and 3.00 (projections/$\mu m^2$) or less.

(2) The honeycomb substrate for a catalyst support according to (1), wherein the maximum width of each of the oxide projections is 100 (nm) to 3 (μm).

(3) The honeycomb substrate for a catalyst support for catalyst support according to (1) or (2), wherein the formation density of the oxide projections is 1.00 (projections/μm$^2$) or more and 3.00 (projections/μm$^2$) or less.

(4) The honeycomb substrate for a catalyst support according to any one of (1) to (3), wherein the honeycomb body includes a stainless steel foil containing at least Cr and Al, and the stainless steel foil and the oxide film contain 9% by mass or more and 30% by mass or less of Cr and 1.5% by mass or more and 13% by mass or less of Al.

(5) A catalytic converter for exhaust gas purification including the honeycomb substrate for a catalyst support according to any one of (1) to (4), and a catalyst supported on the honeycomb substrate for a catalyst support.

Advantageous Effect of Invention

According to the present invention, in the honeycomb substrate for a catalyst support, the adhesion between the catalyst layer and the oxide film can be enhanced.

DESCRIPTION OF EMBODIMENT

Figure 1:
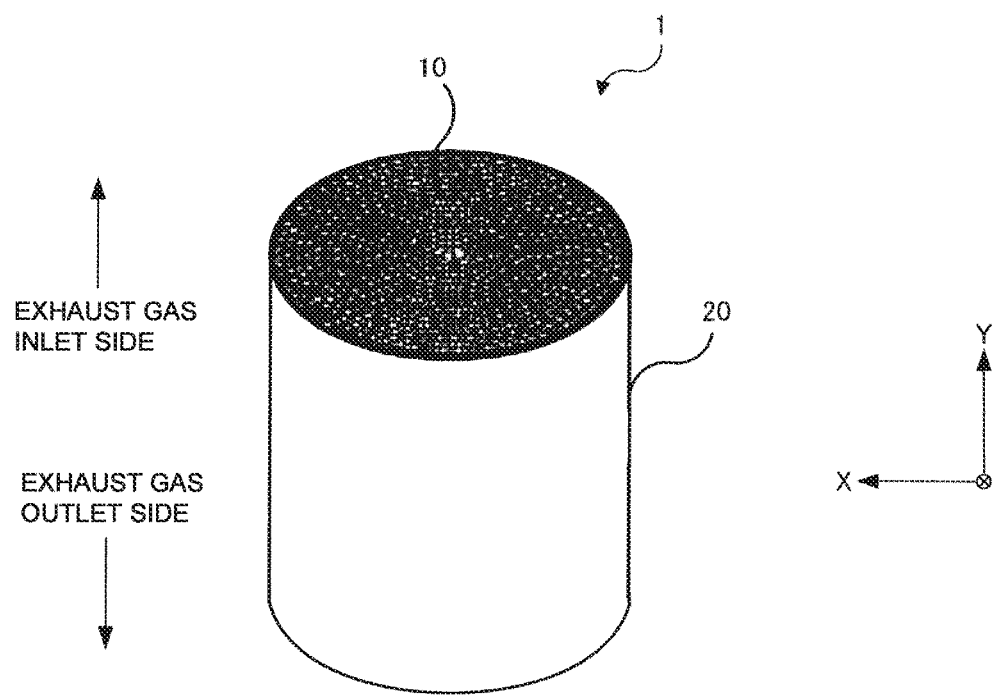
FIG. 1 is a perspective view of a catalytic converter according to an embodiment of the present invention.
Figure 2:
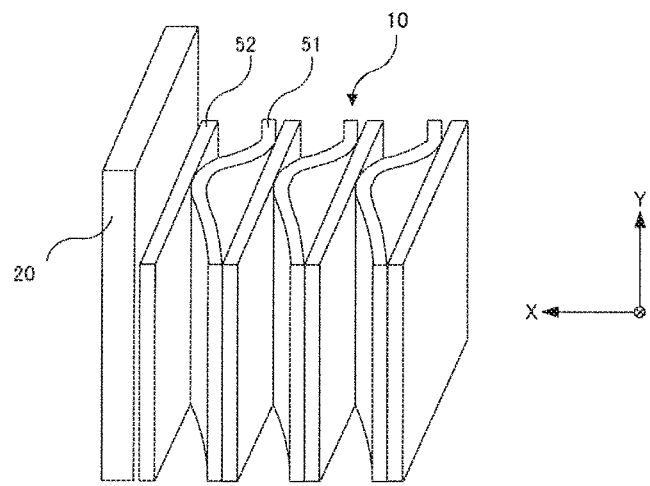
FIG. 2 is an enlarged perspective view of a part of the catalytic converter.

An embodiment of the present invention will be described in detail with reference to drawings. FIG. 1 is a perspective view of a catalytic converter according to an embodiment of the present invention. FIG. 2 is an enlarged perspective view of the catalytic converter. In these figures, the X axis corresponds to the radial direction of the honeycomb body (in other words, the thickness direction of the flat foil), and the Y axis corresponds to the axial direction of a honeycomb body. The definitions of the X axis and the Y axis are the same in the other drawings.

The catalytic converter 1 includes a honeycomb body 10 (corresponding to a honeycomb substrate for a catalyst support) and an outer cylinder 20. A bonding layer (not shown) is formed between an outer peripheral surface of the honeycomb body 10 and an inner peripheral surface of the outer cylinder 20, and the honeycomb body 10 and the outer cylinder 20 are partially bonded via the bonding layer. A highly heat-resistant Ni-based brazing material may be used for the bonding layer. The catalytic converter 1 can be used as a purifier that renders $NO_x$ contained in diesel exhaust gas harmless.

More specifically, the catalytic converter 1 may be used as DOC and SCR provided in a diesel exhaust gas treatment facility. The catalyst converter 1 for DOC oxidizes hydrocarbons of unburned gases contained in the exhaust gas to water and carbon dioxide, oxidizes carbon monoxide to carbon dioxide, and oxidizes nitrogen monoxide to nitrogen dioxide. Since nitrogen dioxide is a highly oxidative gas, nitrogen dioxide burns the PM in contact with PM deposited on the DPF disposed downstream of the DOC.

The catalytic converter 1 as an SCR promotes the chemical reaction of nitrogen oxides and ammonia contained in the exhaust gas discharged from the DPF to reduce the nitrogen oxides and ammonia to nitrogen and water. Ammonia is generated by blowing urea water from a urea water tank via an injector to the upstream side of the SCR and hydrolyzing urea water with heat of the exhaust gas.

The honeycomb body 10 is formed in a roll shape by winding a long wavy corrugated foil 51 and a flat foil 52 extending in a band shape around an axial direction multiple times in a stacked state. For the corrugated foil 51 and the flat foil 52, a stainless steel foil for supporting a catalyst may be used. The components of the stainless steel foils will be described later.

A plurality of flow paths with the corrugated foil 51 and the flat foil 52 as side walls are formed by winding the corrugated foil 51 and the flat foil 52 in a stacked state multiple time. The plurality of flow paths each extend in the axial direction of the catalytic converter 1. The catalytic converter 1 is not limited to ones with a circular cross-sectional shape. For example, other shapes such as oval shape, egg shape, and racetrack (hereinafter referred to as RT) shape may also be used.

Figure 3:
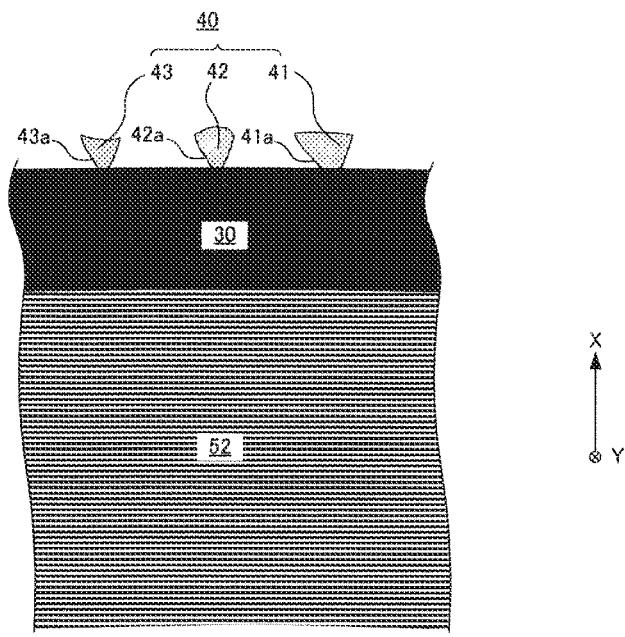
FIG. 3 is an enlarged cross-sectional view of a part of an oxide film formed on a flat foil.
Figure 4:
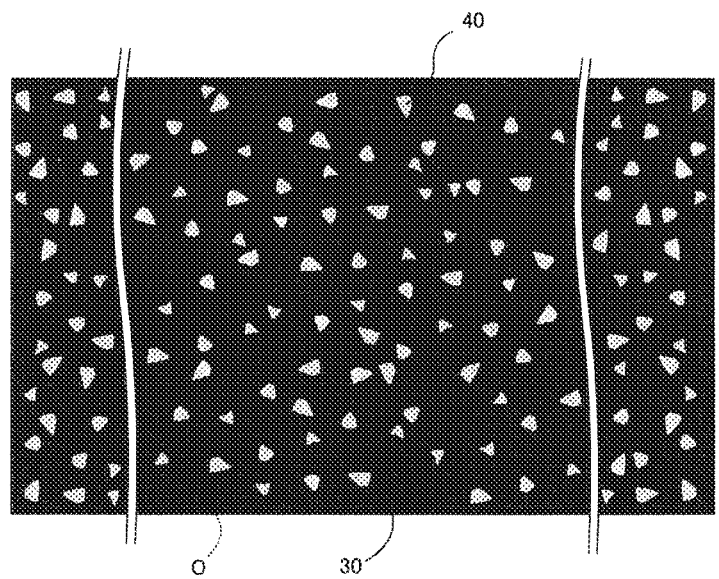
FIG. 4 is a plan view of the oxide film.
Figure 5:
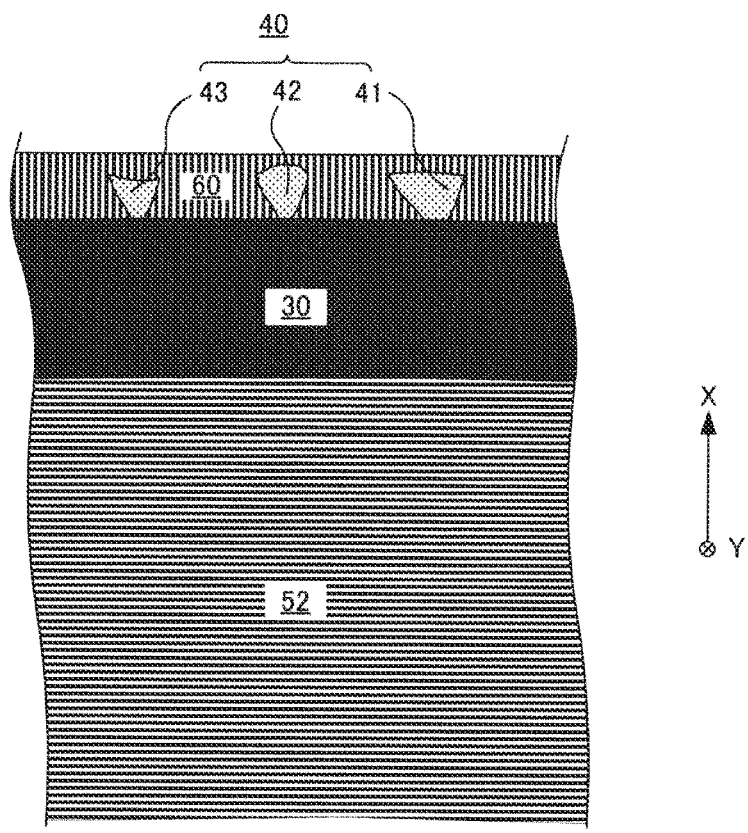
FIG. 5 is an enlarged cross-sectional view corresponding to FIG. 3, schematically showing a state in which a catalyst layer is applied to the oxide film.

A predetermined oxide film is formed on surfaces of the corrugated foil 51 and the flat foil 52, and a catalyst layer closely adheres to the oxide film. FIG. 3 is an enlarged cross-sectional view of a part of an oxide film formed on a flat foil. FIG. 4 is an unfolded view of the flat foil, and schematically shows a large number of projections formed on the surface of the oxide film in a scattered manner. FIG. 5 corresponds to FIG. 3 and schematically shows a state in which the catalyst layer is applied to the oxide film. The oxide film 30 is formed by performing heat treatment on the honeycomb body 10. Although the details will be described later, in the present invention, it is possible to form a large number of projections 40 having shapes different from one another on the surface of the oxide film 30 by performing a special heat treatment (hereinafter referred to as special heat treatment).

FIG. 3 schematically shows three different projections 41 to 43 (corresponding to oxide projections), and a tapered shape portion 41a having a width decreasing toward the flat foil 52 is formed on a lower end of the projection 41. Tapered shape portions 42a and 43a are also formed on projections 42 and 43, respectively. Here, the tapered shape portion needs only to be formed on at least a part of the projections, and the entire projection does not necessarily have to be in a tapered shape.

A catalyst layer 60 is formed on the oxide film 30 by applying a washcoat liquid. As illustrated in FIG. 5, the tapered shape portions (41a and the like) of the projections 40 are buried in the catalyst layer 60, and the anchor effect of the projections 40 makes the catalyst layer 60 firmly adhered to the oxide film 30. That is, the oxide film 30 and the catalyst layer 60 can be firmly adhered without interposing an adhesive layer.

The formation density of the projections 40 in the oxide film 30 is 0.20 to 3.00 (projections/μm$^2$), and preferably 1.00 to 3.00 (projections/μm$^2$). When the formation density is less than 0.20 (projections/μm$^2$), the anchor effect is reduced due to the decrease of the projections 40, and therefore excellent adhesion cannot be exhibited. On the other hand, the higher the formation density, the higher the anchor effect, but the production method found by the present inventors cannot increase the formation density to over 3.00 (projections/μm$^2$). Therefore, the formation density of the projections 40 is limited to 0.20 to 3.00 (projections/μm$^2$). When the formation density is 1.00 (projections/μm$^2$) or more, the adhesion is further enhanced.

The formation density may be calculated based on imaging data of the surface of the oxide film 30 using a scanning electron microscope (SEM). Specifically, the formation density may be calculated by counting the number of projections 40 having a maximum width of 100 (nm) or more present in 100 (μm$^2$) based on imaging data. For example, when the number of projections 40 counted is 200, 2.00 (projections/μm$^2$) obtained by dividing 200 by 100 (μm$^2$) is the formation density.

Figure 6:
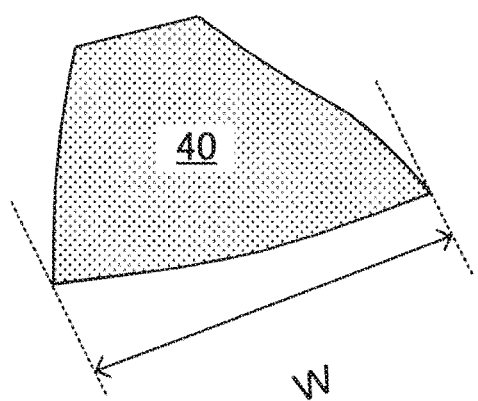
FIG. 6 is an enlarged view of a projection present inside a rectangular frame O shown by a dotted line in FIG. 4.

The maximum width of the projections 40 is preferably 100 (nm) to 3 (μm). Here, the maximum width refers to the maximum length of the projections 40 viewed in the thickness direction of the flat foil 52, and W is the maximum width in FIG. 6. That is, the maximum width of the projections 40 in the in-plane direction of a plane including the flat foil 52. FIG. 6 is an enlarged view of a part of projections shown in FIG. 4 (projections present inside a rectangular frame O). The maximum length of the projections 40 in the corrugated foil 51 is also defined in the same manner as for the flat foil 52.

Next, the components of the oxide film 30 formed on the surface of the honeycomb body 10 by the special heat treatment will be described in detail. The oxide film 30 include α-alumina as a main composition phase. The oxide film 30 includes the large number of projections 40 (the same applies hereinafter).

The remaining components of the oxide film 30 are at least one or more of Fe oxide, Cr oxide, and second alumina. The second alumina includes at least one of β, γ, θ, χ, δ, η, and κ alumina.

Here, the type and content of each oxide contained in the oxide film 30 may be specified by performing phase identification and quantitative measurement using an X-ray diffraction method. For quantitative measurement, it is possible to measure the content by preparing a calibration curve using a standard sample and comparing the diffraction line intensities thereto. The details are described in, for example, Kunio Kataoka and Sadabumi Isshiki; Production Research Vol. 12 No. 8.

The stainless steel foil used for the honeycomb body 10 contains at least Cr and Al. Needless to say, Fe is contained in the stainless steel foil. The contained Al is used to form α-alumina or the like on the stainless steel foil surface. A desirable range of the total amount of Al contained in the stainless steel foil and in the oxide film 30 as α-alumina or the like is 1.5% or more and 13% or less, by mass %. When the content is less than 1.5%, Al contained in the stainless steel foil may be consumed for the formation of α-alumina or the like by the special heat treatment and Al in the stainless steel foil may be depleted. In this case, the stainless steel foil is abnormally oxidized to be smashed, so 1.5% or more is desirable. When the content exceeds 13%, the toughness of the stainless steel foil is significantly reduced and chipping and cracking of the foil occur due to the pressure and vibration of the exhaust gas, resulting in the deterioration of structural reliability. Therefore, the maximum value of the total Al concentration contained in the oxide film 30 and the stainless steel foil is preferably 13% or less.

Cr stabilizes α-alumina and improves oxidation resistance in the present invention. A desirable range of the total amount of Cr contained in the stainless steel foil and in the oxide film 30 is 9% or more and 30% or less, by mass %. When the content is less than 9%, the effect is insufficient, and when the content exceeds 30%, the steel becomes brittle and cannot withstand cold rolling or processing, the range is thus preferably 9% or more and 30% or less. A part of Cr is present in the oxide film 30 in the form of Cr oxide, and the remainder of Cr remains as it is in the stainless steel foil. However, Cr oxide is not essential, and all Cr may remain in the stainless steel foil as it is.

The stainless steel foil may further contain at least one of Ti, Zr, Nb, Hf, Mg, Ca, Ba, Y and a rare earth element.

Ti, Zr, Nb, and Hf reduce the oxygen permeability of another oxide film formed as an underlayer between the above-described oxide film 30 containing α-alumina and a stainless steel foil, thereby significantly reducing the oxidation rate effective. However, when the sum total thereof exceeds 2.0%, by mass %, precipitation of intermetallic compounds in the foil increases and the foil becomes brittle, and therefore the sum total thereof is preferably 2.0% or less.

Mg, Ca, and Ba may also form a solid solution in alumina to improve the high-temperature oxidation resistance of the stainless steel foil. Since the toughness of a foil is reduced when the sum total exceeds 0.01%, by mass %, the sum total is preferably 0.01% or less.

Y and a rare earth element may be added as an element for securing the adhesion of the oxide film 30. However, when the sum total thereof exceeds 0.5%, by mass %, precipitation of intermetallic compounds in the foil increases and the toughness decreases, and therefore the sum total thereof is preferably 0.5% or less.

The stainless steel foil further contains C, Si, and Mn as unavoidable impurities.

Since C adversely affects the toughness, ductility, and oxidation resistance of the stainless steel foil, the C content is desirably low, but in the present invention, the upper limit is desirably 0.1%, by mass %, because there is no real harm in the case where the content thereof is 0.1% or less.

Si decreases the toughness and ductility of the stainless steel foil and generally improves the oxidation resistance, but when the content thereof exceeds 2% by mass %, not only the effect is diminished, but there is also a problem that the toughness is lowered. Therefore, the content thereof is preferably 2% or less.

The upper limit of Mn is preferably 2%, by mass %, because the oxidation resistance of the stainless steel foil is degraded when the Mn content exceeds 2%.

Figure 7:
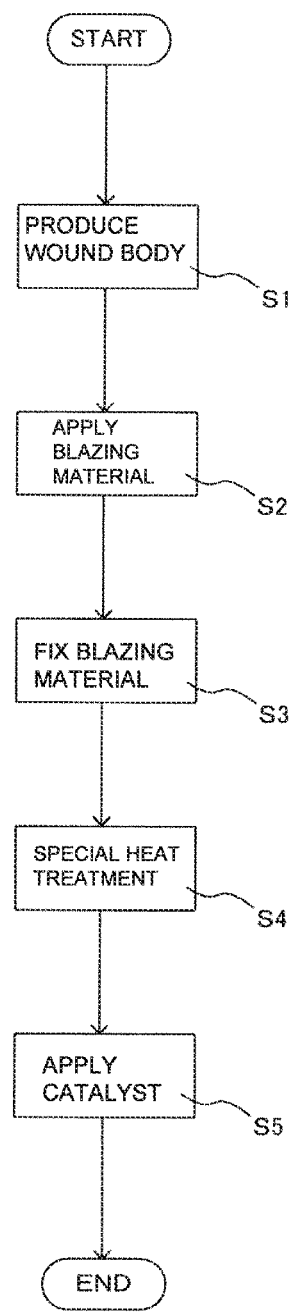
FIG. 7 is a process diagram illustrating a method of producing a catalytic converter.

Next, with reference to a process diagram of FIG. 7, a method of producing the catalytic converter of the present embodiment including the special heat treatment will be described. In step S1, a stainless steel foil extending in a band shape is pressed to form corrugation, and the stainless steel foil in a stacked state with the flat foil 52 is wound around a predetermined axis to produce the honeycomb body 10.

In step S2, the honeycomb body 10 is inserted into a cylindrical outer cylinder 20 made of stainless steel, and a brazing material is applied to bonding planned portions between the honeycomb body 10 and the outer cylinder 20. In step S3, the honeycomb body 10 and the outer cylinder 20 to which the brazing material is applied are heat-treated in a vacuum atmosphere to fix the brazing material.

In step S4, the special heat treatment is performed. The special heat treatment is performed by placing the honeycomb body 10 inserted into the outer cylinder 20 under a predetermined temperature condition. The atmospheric temperature is controlled to a holding temperature of 800° C. to 1300° C. and the holding time is preferably 1 to 4 hours or more.

The thickness of the oxide film 30 may be modified by adjusting the holding temperature and the holding time and is preferably 0.10 μm or more and 10 μm or less.

The formation mechanism of the projections 40 will be discussed with reference to FIG. 3 to FIG. 5. When the honeycomb body 10 is oxidized by the special heat treatment, Fe, Cr, and Al contained in the flat foil 52 are oxidized at the initial stage of oxidation. Here, the generation volume increases in the order of Al, Cr, and Fe in accordance with the magnitude of the formation free energy of each oxide. In a relatively low-temperature region of less than 800° C., the formation and growth of the metastable phases β, γ, θ, χ, δ, η, and κ alumina (hereinafter referred to as metastable alumina) are more promoted than those of α-alumina which is a stable phase among Al oxides. That is, these metastable aluminas have a faster growth rate than α-alumina.

When the temperature reached a relatively high temperature region of 800° C. or more, the grain growth of α-alumina becomes relatively slow, but the metastable aluminas (mainly γ-alumina) maintain a relatively fast growth rate and protrudes from the periphery, and exhibits a behavior approaching to a shape that minimizes the surface area (in other words, a behavior that approaches a spherical shape). As a result, it is considered that the projections 40 provided with the tapered shape portions (41a and the like) are formed. In addition, a part of the metastable aluminas is transformed into α-alumina phase. In particular, it is estimated that this is remarkably shown in a temperature range of 900° C. or more. On the other hand, since Cr oxides (mainly $Cr_2O_3$) and Fe oxides (mainly $Fe_2O_3$) have the same crystal structure as α-alumina, a part thereof becomes nucleation sites for α-alumina, and it is thought that α-alumina grows gradually adjacent to the grains of the Fe oxides and the Cr oxides.

It is considered that the projections are formed on the corrugated foil 51 by the same mechanism. From the above consideration, it is considered that the projections 40 having α-alumina as a main component are generated.

Here, it is also important, as a condition of the special heat treatment, to set the average temperature rise rate from room temperature to the heat retention temperature to 1.0 (° C./min) or more and 20.0 (° C./min) or less. When the average temperature rise rate is too low, formation and growth of the metastable aluminas are promoted excessively such that the aluminum contained in the stainless steel foil runs short. When the amount of aluminum contained in the stainless steel foil is insufficient, the life of the honeycomb body 10 is shortened. From this, the average temperature rise rate at the time of heating must be 1.0 (° C./min) or more. The temperature rise rate is preferably gradually increased (increase as a linear function or a quadratic function), and more preferably increased linearly (increase as a linear function).

The present inventors have found that when the average temperature rise rate exceeds 20.0 (° C./min), the adhesion between the oxide film 30 and the catalyst layer 60 decreases. When the temperature reaches the high temperature region (for example, 800° C. or more) in the initial stage of oxidation, the formation and growth of β, γ, θ, χ, δ, η, and κ alumina become insufficient, and the final formation density of the projections 40 decreases. Therefore, in order to increase the formation density of the projections 40, it is necessary to set the temperature in the initial stage of oxidation to a low-temperature region to promote the formation and growth of β, γ, θ, χ, δ, η, and κ alumina. By setting the average temperature rise rate at the time of heating to 20.0 (° C./min) or less, the temperature in the initial stage of oxidation becomes a low-temperature region, and thus more projections 40 are generated and thus the catalyst layer 60 can be firmly adhered to the oxide film 30 due to the anchor effect. That is, the projections 40 having a formation density of 0.20 (projections/μm$^2$) or more and 3.00 (projections/μm$^2$) or less and a maximum width of 100 (nm) to 3 (μm) can be obtained by setting the average temperature rise rate to 1.0 (° C./min) or more and 20.0 (° C./min) or less.

As described above, the large number of projections 40 can be formed only by controlling the average temperature rise rate at the time of forming the oxide film 30 to a predetermined average temperature rise rate. Since an independent process (for example, blasting process) is not required to obtain the large number of projections 40, the process can be prevented from being complicated.

Here, the conventional average temperature rise rate was 25.0 (° C./min) over 20.0 (° C./min) in order to enhance productivity. Even when the stainless steel foil was heated at the average temperature rise rate of 25.0 (° C./min), an oxide film was formed, but when the surface of this oxide film was observed with an electron microscope, projections 40 having a tapered shape were hardly confirmed. The inventors of the present invention have found that the projections 40 having a tapered shape rapidly appear by setting the average temperature rise rate to 20.0 (° C./min) or less.

In step 5, the honeycomb body 10 on which the oxide film 30 is formed and the outer cylinder 20 are immersed in a catalyst bath to produce the catalyst converter 1.

Next, the present invention will be specifically described by way of Examples. By performing the special heat treatment on the stainless steel foil, oxide films having different formation densities of the oxide projections were formed, and the catalyst adhesion was evaluated for each oxide film. In Comparative Example 1, no heat treatment was performed. As the evaluation method, the following test method based on "JIS K 5600_5_6 adhesion (cross-cut method)" was adopted. The surface of the applied catalyst was cut with a cutter knife forming six cuts reaching into the stainless steel foil. Next, other cuts were made in the same method in a direction orthogonal to the six cuts by 90° to obtain 30 grids. The interval between the above cuts was 1 mm. Cellophane tape was put on the 30 cuts in a shape of the grid, and the edge of the cellophane tape was pulled apart at an angle close to 60°. Of the 30 grids, a grid where the stainless steel foil of the substrate cannot be seen was regarded as a sound area, and when the proportion of the sound area was 90% or more, the catalyst adhesion was evaluated as "very good" as being excellent, in a case of 70% or more and less than 90%, the catalyst adhesion was evaluated as "good" as being good, and when the proportion of the sound area was less than 70%, the catalyst adhesion was evaluated as "poor" as being poor. The application of the catalyst to the stainless steel foil was carried out as follows. A slurry was prepared by kneading alumina powder (particle diameter D50=21.0 μm) and ceria-zirconia complex oxide powder (particle diameter D50=3.51 μm) together with water and a binder (using alumina sol) for 2 hours in a ball mill, the stainless steel foil was immersed therein and pulled up and dried until the application amount reached 5 to 7 mg/cm$^2$, and then heat treatment was carried out in the air at 500° C. for 5 hours to fix the catalyst on the stainless steel foil. As a result, a catalyst layer having a thickness of 10 μm to 20 μm was obtained, which is a thickness sufficient enough to bury all the projections in the catalyst layer.

The formation density of the oxide projections was changed by controlling the temperature rise rate. Table 1 shows foil thicknesses and foil components of stainless steel foils (including oxide film) of Inventive Examples 1 to 36 and Comparative Examples 1 to 11, respectively. Table 2 shows the evaluations of the heat treatment conditions, the components of the oxide film, the formation densities, and the catalyst adhesion of Inventive Examples 1 to 36 and Comparative Examples 1 to 11.

TABLE 1

| | | Foil components (including oxides) | | | | | |
|---|---|---|---|---|---|---|---|
| No. | Foil thickness μm | Cr % by mass | Al % by mass | Fe % by mass | Additive elements % by mass | Unavoidable impurities % by mass | REMARKS |
| 1 | 30 | 20.1 | 5.2 | 73.2 | 0.08% Ti, 0.09% REM | C, Si, Mn | Compatarive Example 1 |
| 2 | 30 | 20.1 | 5.2 | 73.2 | 0.08% Ti, 0.09% REM | C, Si, Mn | Inventive Example 1 |
| 3 | 30 | 20.1 | 5.2 | 73.2 | 0.08% Ti, 0.09% REM | C, Si, Mn | Inventive Example 2 |
| 4 | 30 | 20.1 | 5.2 | 73.2 | 0.08% Ti, 0.09% REM | C, Si, Mn | Inventive Example 3 |
| 5 | 30 | 20.1 | 5.2 | 73.2 | 0.08% Ti, 0.09% REM | C, Si, Mn | Inventive Example 4 |
| 6 | 30 | 20.1 | 5.2 | 73.2 | 0.08% Ti, 0.09% REM | C, Si, Mn | Inventive Example 5 |
| 7 | 30 | 20.1 | 5.2 | 73.2 | 0.08% Ti, 0.09% REM | C, Si, Mn | Inventive Example 6 |
| 8 | 30 | 20.1 | 5.2 | 73.2 | 0.08% Ti, 0.09% REM | C, Si, Mn | Inventive Example 7 |
| 9 | 30 | 20.1 | 5.2 | 73.2 | 0.08% Ti, 0.09% REM | C, Si, Mn | Inventive Example 8 |
| 10 | 30 | 20.1 | 5.2 | 73.2 | 0.08% Ti, 0.09% REM | C, Si, Mn | Inventive Example 9 |
| 11 | 30 | 20.1 | 5.2 | 73.2 | 0.08% Ti, 0.09% REM | C, Si, Mn | Inventive Example 10 |
| 12 | 30 | 20.1 | 5.2 | 73.2 | 0.08% Ti, 0.09% REM | C, Si, Mn | Inventive Example 11 |
| 13 | 30 | 20.1 | 5.2 | 73.2 | 0.08% Ti, 0.09% REM | C, Si, Mn | Inventive Example 12 |
| 14 | 20 | 19.8 | 7.5 | 71.5 | 0.10% Zr 0.11% La | C, Si, Mn | Inventive Example 13 |
| 15 | 20 | 19.8 | 7.5 | 71.5 | 0.10% Zr 0.11% La | C, Si, Mn | Inventive Example 14 |
| 16 | 20 | 19.8 | 7.5 | 71.5 | 0.10% Zr 0.11% La | C, Si, Mn | Inventive Example 15 |
| 17 | 20 | 19.8 | 7.5 | 71.5 | 0.10% Zr 0.11% La | C, Si, Mn | Inventive Example 16 |
| 18 | 20 | 19.8 | 7.5 | 71.5 | 0.10% Zr 0.11% La | C, Si, Mn | Inventive Example 17 |
| 19 | 20 | 19.8 | 7.5 | 71.5 | 0.10% Zr 0.11% La | C, Si, Mn | Inventive Example 18 |
| 20 | 20 | 19.8 | 7.5 | 71.5 | 0.10% Zr 0.11% La | C, Si, Mn | Inventive Example 19 |
| 21 | 20 | 19.8 | 7.5 | 71.5 | 0.10% Zr 0.11% La | C, Si, Mn | Inventive Example 20 |
| 22 | 20 | 19.8 | 7.5 | 71.5 | 0.10% Zr 0.11% La | C, Si, Mn | Inventive Example 21 |
| 23 | 20 | 19.8 | 7.5 | 71.5 | 0.10% Zr 0.11% La | C, Si, Mn | Inventive Example 22 |
| 24 | 20 | 19.8 | 7.5 | 71.5 | 0.10% Zr 0.11% La | C, Si, Mn | Inventive Example 23 |
| 25 | 20 | 19.8 | 7.5 | 71.5 | 0.10% Zr 0.11% La | C, Si, Mn | Inventive Example 24 |
| 26 | 50 | 18.1 | 3.5 | 77.9 | 0.1% Nb, 0.09% Hf | C, Si, Mn | Inventive Example 25 |
| 27 | 50 | 18.1 | 3.5 | 77.9 | 0.1% Nb, 0.09% Hf | C, Si, Mn | Inventive Example 26 |
| 28 | 50 | 18.1 | 3.5 | 77.9 | 0.1% Nb, 0.09% Hf | C, Si, Mn | Inventive Example 27 |
| 29 | 50 | 18.1 | 3.5 | 77.9 | 0.1% Nb, 0.09% Hf | C, Si, Mn | Inventive Example 28 |
| 30 | 50 | 18.1 | 3.5 | 77.9 | 0.1% Nb, 0.09% Hf | C, Si, Mn | Inventive Example 29 |
| 31 | 50 | 18.1 | 3.5 | 77.9 | 0.1% Nb, 0.09% Hf | C, Si, Mn | Inventive Example 30 |
| 32 | 50 | 18.1 | 3.5 | 77.9 | 0.1% Nb, 0.09% Hf | C, Si, Mn | Inventive Example 31 |
| 33 | 50 | 18.1 | 3.5 | 77.9 | 0.1% Nb, 0.09% Hf | C, Si, Mn | Inventive Example 32 |
| 34 | 50 | 18.1 | 3.5 | 77.9 | 0.1% Nb, 0.09% Hf | C, Si, Mn | Inventive Example 33 |
| 35 | 50 | 18.1 | 3.5 | 77.9 | 0.1% Nb, 0.09% Hf | C, Si, Mn | Inventive Example 34 |
| 36 | 50 | 18.1 | 3.5 | 77.9 | 0.1% Nb, 0.09% Hf | C, Si, Mn | Inventive Example 35 |
| 37 | 50 | 18.1 | 3.5 | 77.9 | 0.1% Nb, 0.09% Hf | C, Si, Mn | Inventive Example 36 |
| 38 | 30 | 20.1 | 5.2 | 73.2 | 0.08% Ti, 0.09% REM | C, Si, Mn | Compatarive Example 2 |
| 39 | 30 | 20.1 | 5.2 | 73.2 | 0.08% Ti, 0.09% REM | C, Si, Mn | Compatarive Example 3 |
| 40 | 30 | 20.1 | 5.2 | 73.2 | 0.08% Ti, 0.09% REM | C, Si, Mn | Compatarive Example 4 |
| 41 | 30 | 20.1 | 5.2 | 73.2 | 0.08% Ti, 0.09% REM | C, Si, Mn | Compatarive Example 5 |
| 42 | 30 | 20.1 | 5.2 | 73.2 | 0.08% Ti, 0.09% REM | C, Si, Mn | Compatarive Example 6 |
| 43 | 30 | 20.1 | 5.2 | 73.2 | 0.08% Ti, 0.09% REM | C, Si, Mn | Compatarive Example 7 |
| 44 | 20 | 19.8 | 7.5 | 71.5 | 0.10% Zr 0.11% La | C, Si, Mn | Compatarive Example 8 |
| 45 | 20 | 19.8 | 7.5 | 71.5 | 0.10% Zr 0.11% La | C, Si, Mn | Compatarive Example 9 |
| 46 | 50 | 18.1 | 3.5 | 77.9 | 0.1% Nb, 0.09% Hf | C, Si, Mn | Compatarive Example 10 |
| 47 | 50 | 18.1 | 3.5 | 77.9 | 0.1% Nb, 0.09% Hf | C, Si, Mn | Compatarive Example 11 |

TABLE 2

| | Heat treatment | | | | Oxide film | | | | | |
|---|---|---|---|---|---|---|---|---|---|---|
| No. | Temperature ° C. | Duration h | Atmosphere | Temperature rise rate ° C./min | Film thickness μm | α-alumina % by mass | Balance Type | Formation density projections/ μm$^2$ | Catalyst adhesion | REMARKS |
| 1 | None | | | — | None | 0 | | | Poor | Compatarive Example 1 |
| 2 | 800 | 1 | Air | 20.0 | 0.12 | 31 | Second alumina, Fe oxide | 0.2 | Good | Inventive Example 1 |
| 3 | 900 | 1 | Air | 5.0 | 0.3 | 64 | Second alumina, Fe oxide | 1.25 | Very good | Inventive Example 2 |
| 4 | 1000 | 1 | Air | 1.0 | 0.6 | 85 | Fe oxide | 2.62 | Very good | Inventive Example 3 |
| 5 | 1100 | 1 | Air | 1.0 | 1.3 | 99.4 | Fe oxide | 3 | Very good | Inventive Example 4 |

TABLE 2-continued

| No. | Heat treatment Temperature °C | Duration h | Atmosphere | Temperature rise rate °C./min | Oxide film Film thickness μm | α-alumina % by mass | Balance Type | Formation density projections/μm² | Catalyst adhesion | REMARKS |
|---|---|---|---|---|---|---|---|---|---|---|
| 6 | 800 | 1 | Air | 15.0 | 0.13 | 32 | Second alumina, Fe oxide | 0.31 | Good | Inventive Example 5 |
| 7 | 900 | 1 | Air | 3.0 | 0.3 | 64 | Second alumina, Fe oxide | 1.54 | Very good | Inventive Example 6 |
| 8 | 1000 | 1 | Air | 3.0 | 0.6 | 86 | Fe oxide | 2.44 | Very good | Inventive Example 7 |
| 9 | 1100 | 1 | Air | 2.0 | 1.3 | 98.6 | Fe oxide | 2.8 | Very good | Inventive Example 8 |
| 10 | 800 | 1 | Air | 5.0 | 0.12 | 31 | Second alumina, Fe oxide | 1.33 | Very good | Inventive Example 9 |
| 11 | 900 | 1 | Air | 3.0 | 0.3 | 62 | Second alumina, Fe oxide | 1.8 | Very good | Inventive Example 10 |
| 12 | 1000 | 1 | Air | 2.0 | 0.6 | 86 | Fe oxide | 2.57 | Very good | Inventive Example 11 |
| 13 | 1100 | 1 | Air | 2.0 | 1.2 | 97.2 | Fe oxide | 2.71 | Very good | Inventive Example 12 |
| 14 | 800 | 4 | Air | 15.0 | 0.16 | 31 | Second alumina, Fe oxide | 0.38 | Good | Inventive Example 13 |
| 15 | 900 | 4 | Air | 5.0 | 0.37 | 56 | Second alumina, Fe oxide | 1.23 | Very good | Inventive Example 14 |
| 16 | 1000 | 4 | Air | 3.0 | 0.71 | 87 | Fe oxide | 2.15 | Very good | Inventive Example 15 |
| 17 | 1100 | 4 | Air | 1.0 | 1.62 | 95.7 | Fe oxide | 2.85 | Very good | Inventive Example 16 |
| 18 | 800 | 4 | Air | 15.0 | 0.16 | 34 | Second alumina, Fe oxide | 0.65 | Good | Inventive Example 17 |
| 19 | 900 | 4 | Air | 5.0 | 0.38 | 57 | Second alumina, Fe oxide | 1.22 | Very good | Inventive Example 18 |
| 20 | 1000 | 4 | Air | 2.0 | 0.72 | 85 | Fe oxide | 2.38 | Very good | Inventive Example 19 |
| 21 | 1100 | 4 | Air | 1.0 | 1.63 | 98.1 | Fe oxide | 2.86 | Very good | Inventive Example 20 |
| 22 | 800 | 4 | Air | 15.0 | 0.15 | 31 | Second alumina, Fe oxide | 0.6 | Good | Inventive Example 21 |
| 23 | 900 | 4 | Air | 5.0 | 0.45 | 61 | Second alumina, Fe oxide | 1.39 | Very good | Inventive Example 22 |
| 24 | 1000 | 4 | Air | 2.0 | 0.75 | 84 | Fe oxide | 2.55 | Very good | Inventive Example 23 |
| 25 | 1100 | 4 | Air | 1.0 | 1.6 | 97.2 | Fe oxide | 2.8 | Very good | Inventive Example 24 |
| 26 | 800 | 0.5 | Air | 20.0 | 0.12 | 32 | Second alumina, Fe oxide | 0.21 | Good | Inventive Example 25 |
| 27 | 900 | 0.5 | Air | 7.0 | 0.24 | 57 | Second alumina, Fe oxide | 1.36 | Very good | Inventive Example 26 |
| 28 | 1000 | 0.5 | Air | 3.0 | 0.51 | 85 | Fe oxide | 2.2 | Very good | Inventive Example 27 |
| 29 | 1100 | 0.5 | Air | 1.0 | 1.12 | 94 | Fe oxide | 2.8 | Very good | Inventive Example 28 |
| 30 | 800 | 0.5 | Air | 10.0 | 0.12 | 34 | Second alumina, Fe oxide | 1.02 | Very good | Inventive Example 29 |
| 31 | 900 | 0.5 | Air | 5.0 | 0.26 | 61 | Second alumina, Fe oxide | 1.52 | Very good | Inventive Example 30 |
| 32 | 1000 | 0.5 | Air | 2.0 | 0.52 | 84 | Fe oxide | 2.43 | Very good | Inventive Example 31 |
| 33 | 1100 | 0.5 | Air | 1.0 | 1.13 | 95.1 | Fe oxide | 3 | Very good | Inventive Example 32 |
| 34 | 800 | 0.5 | Air | 20.0 | 0.13 | 31 | Second alumina, Fe oxide | 0.2 | Good | Inventive Example 33 |
| 35 | 900 | 0.5 | Air | 3.0 | 0.27 | 60 | Second alumina, Fe oxide | 1.82 | Very good | Inventive Example 34 |
| 36 | 1000 | 0.5 | Air | 2.0 | 0.51 | 83 | Fe oxide | 2.5 | Very good | Inventive Example 35 |
| 37 | 1100 | 0.5 | Air | 1.0 | 1.15 | 96.3 | Fe oxide | 2.92 | Very good | Inventive Example 36 |
| 38 | 800 | 1 | Air | 21.0 | 0.12 | 31 | Second alumina, Fe oxide | 0.11 | Poor | Compatarive Example 2 |
| 39 | 1000 | 1 | Air | 21.0 | 0.6 | 85 | Fe oxide | 0.08 | Poor | Compatarive Example 3 |
| 40 | 800 | 1 | Air | 23.0 | 0.13 | 32 | Second alumina, Fe oxide | 0.15 | Poor | Compatarive Example 4 |
| 41 | 1000 | 1 | Air | 30.0 | 0.6 | 86 | Fe oxide | 0.09 | Poor | Compatarive Example 5 |
| 42 | 900 | 1 | Air | 25.0 | 0.3 | 62 | Second alumina, Fe oxide | 0.13 | Poor | Compatarive Example 6 |
| 43 | 1100 | 1 | Air | 25.0 | 1.3 | 97.2 | Fe oxide | 0.02 | Poor | Compatarive Example 7 |
| 44 | 900 | 4 | Air | 25.0 | 0.37 | 56 | Second alumina, Fe oxide | 0.12 | Poor | Compatarive Example 8 |
| 45 | 1100 | 4 | Air | 21.0 | 1.62 | 95.7 | Fe oxide | 0.06 | Poor | Compatarive Example 9 |
| 46 | 900 | 0.5 | Air | 25.0 | 0.24 | 57 | Second alumina, Fe oxide | 0.04 | Poor | Compatarive Example 10 |
| 47 | 1000 | 0.5 | Air | 30.0 | 0.51 | 85 | Fe oxide | 0.18 | Poor | Compatarive Example 11 |

As shown in the above test results, it was found that the catalyst adhesion is enhanced by controlling the formation density of the oxide projections to 0.20 (projections/μm²) or more and 3.00 (projections/μm²) or less. In particular, it was found that the catalyst adhesion is further enhanced by setting the formation density to 1.00 (projections/μm²) or more and 3.00 (projections/μm²) or less. Moreover, it was found that such effective oxide projections were developed by controlling the temperature rise rate to 20.0 (° C./min) or less.

Figure 8:
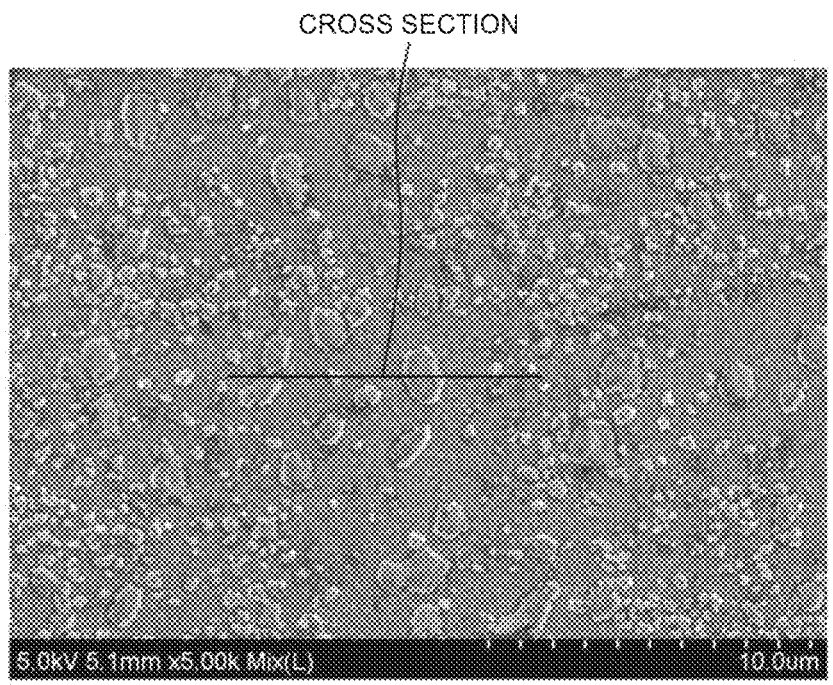
FIG. 8 is a plan photograph of a part of the oxide film.
Figure 9:
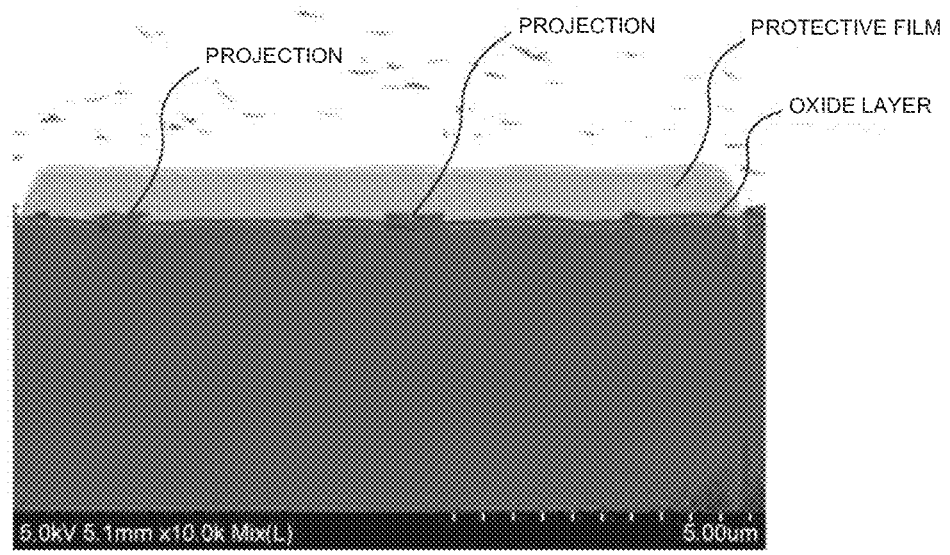
FIG. 9 is a photograph of a cross section of a selected part observed by SEM after being processed by FIB.

FIG. 8 is a plan photography of a part of the oxide film formed on the surface of the stainless steel foil of Inventive Example 1 (hereinafter, referred to as a selected part). FIG. 9 is a photograph depicting a cross section observed by SEM (scanning electron microscope) after the stainless steel foil having a protective film made of tungsten (W) covering the selected part with the protective film is cut to create a cross-section by FIB (focused ion beam). The position of the cross section is indicated by a straight line in FIG. 8. For cross-sectional observation, an FIB-SEM combined apparatus (NB5000: manufactured by Hitachi High-Technologies Corporation) was used. The acceleration voltage was set to 5 (kV), and secondary electrons were used for the detection signal. As shown in FIG. 9, projections having a tapered shape portion were observed. The content of α-alumina in the oxide film was approximately 30% by mass to 99.5% by mass, and this did not change regardless of the temperature rise rate. Since α-alumina is contained in all the oxide films, claim 1 defines "α-alumina as a main component"; however, there is no relevancy between the content of α-alumina and the problem of the present application (adhesion of catalyst).

REFERENCE SIGNS LIST

1 catalytic converter
10 honeycomb body
20 outer cylinder
30 oxide film
40 projections

The invention claimed is:
1. A honeycomb substrate for a catalyst support used for exhaust gas purification comprising:
   a honeycomb body; and
   an oxide film having α-alumina as a main component formed on a surface of the honeycomb body, wherein the oxide film includes a large number of oxide projections formed on a surface of the film in a scattered manner, the large number of oxide projections each having a tapered shape portion with a width decreasing toward the honeycomb body, the large number of oxide projections are formed to let a catalyst layer adhere to the oxide film without an adhesive layer, and a formation density of the oxide projections on the film surface is 0.20 (projections/$\mu m^2$) or more and 3.00 (projections/$\mu m^2$) or less.

2. The honeycomb substrate for a catalyst support according to claim 1, wherein a maximum width of each of the oxide projections is 100 (nm) to 3 ($\mu m$).

3. The honeycomb substrate for a catalyst support according to claim 1, wherein the formation density of the oxide projections is 1.00 (projections/$\mu m^2$) or more and 3.00 (projections/$\mu m^2$) or less.

4. The honeycomb substrate for a catalyst support according to claim 1, wherein the honeycomb body includes a stainless steel foil containing at least Cr and Al, and the stainless steel foil and the oxide film contain 9% by mass or more and 30% by mass or less of Cr and 1.5% by mass or more and 13% by mass or less of Al.

5. A catalytic converter for exhaust gas purification comprising:

the honeycomb substrate for a catalyst support according to claim 1; and the catalyst layer.

\* \* \* \* \*